United States Patent [19]
Ward

[11] 3,886,741
[45] June 3, 1975

[54] HYDROSTATIC TRANSMISSION ANTI-STALL SYSTEM

[75] Inventor: Harold R. Ward, Marshall, Mich.

[73] Assignee: Eaton Corp., Cleveland, Ohio

[22] Filed: Mar. 13, 1974

[21] Appl. No.: 450,280

Related U.S. Application Data

[63] Continuation-in-part of Ser. No. 356,720, May 3, 1973, abandoned.

[52] U.S. Cl. .................. 60/431; 60/445; 60/449
[51] Int. Cl. ........................................ F16h 39/46
[58] Field of Search ............ 60/431, 445, 447, 449, 60/19

[56] References Cited
UNITED STATES PATENTS

| | | | |
|---|---|---|---|
| 3,139,723 | 7/1964 | Hollowell | 60/433 |
| 3,533,230 | 10/1970 | Draper | 60/19 |
| 3,572,213 | 3/1971 | Lauck | 60/449 |

*Primary Examiner*—Martin P. Schwadron
*Assistant Examiner*—H. Burks, Sr.
*Attorney, Agent, or Firm*—Teagno & Toddy

[57] ABSTRACT

An improved control system for a hydrostatic transmission includes an anti-stall system for preventing overloading of an engine which drives the hydrostatic transmission. This anti-stall system is provided with a rate control assembly which is effective to negate oscillating or overcorrecting tendencies of the anti-stall system during rapid changes in the loading of an engine which drives the transmission. The anti-stall system includes first and second valve assemblies which are interconnected by a conduit. The first valve assembly is operable to vary the fluid pressure in this conduit to effect operation of the second valve assembly and a variation in the output speed of the hydrostatic transmission. A rate control assembly is connected with the conduit between the first and second valve assemblies and is effective to induce a flow of fluid to retard operation of the first valve assembly in response to a rapid change in the fluid pressure in the conduit. The rate control assembly is rendered ineffective during steady state and slowly changing load conditions by a rate control orifice which allows low rates of fluid flow from the rate control assembly to pass through the first valve assembly without retarding its operation. A pair of rate control limit check valves are advantageously connected in parallel with the rate control orifice to enable the anti-stall valve assembly to quickly respond to relatively large changes in load.

15 Claims, 3 Drawing Figures

3,886,741

HYDROSTATIC TRANSMISSION ANTI-STALL SYSTEM

BACKGROUND OF THE INVENTION

This application is a continuation-in-part of copending application Ser. No. 356,720, filed May 3, 1973, now abandoned, by Harold R. Ward and titled "Hydrostatic Transmission Anti-stall System" and is entitled to the benefit of the filing date of that application for subject matter in common therewith.

The present invention relates to an anti-stall system which is utilized to vary the input to output speed ratio of a hydrostatic transmission to prevent overloading of a prime mover.

A known hydrostatic transmission control system includes an anti-stall system which senses the operating speed of an engine which drives a hydrostatic transmission and the setting of a throttle or accelerator for the engine. Upon the occurrence of an impending overloading of the engine, this known anti-stall system reduces the fluid pressure conducted to a pressure regulator or speed control valve. This known hydrostatic transmission control system is disclosed in U.S. Pat. application Ser. No. 237,086, filed Mar. 22, 1972, by Edward J. Bojas, and entitled Hydrostatic Transmission Control System now U.S. Pat. No. 3,783,611 issued Jan. 8, 1974. Other known hydrostatic transmission drive systems having anti-stall arrangements are disclosed in U.S. Pat. Nos. 3,533,230 and 3,139,723.

These known hydrostatic transmission control systems having anti-stall arrangements are more or less satisfactory in their operation. However, during rapid changes in the loading of an engine or prime mover, these known anti-stall systems may oscillate or overcorrect. This tendency toward oscillation or overcorrecting makes precise swash angle corrections over a narrow engine speed range very difficult. Due to the difficulty making anti-stall corrections without instability or oscillation, difficulties are encountered in utilizing maximum engine power without overloading the engine during changes in operating conditions.

SUMMARY OF THE PRESENT INVENTION

The present invention provides a new and improved hydrostatic transmission control system having an anti-stall assembly to prevent overloading of an engine or prime mover which drives a hydrostatic transmission. A rate control assembly is associated with the anti-stall assembly to negate oscillating and overcorrecting during changes in the load on the engine. The rate control assembly interacts with the anti-stall assembly to prevent oscillations or overcorrecting without sacrificing steady state sensitivity.

The rate control assembly senses a rapid change in the output of the anti-stall assembly and, in response thereto, provides a fluid output signal which retards operation of the anti-stall assembly. By retarding operation of the anti-stall assembly, the rate control assembly prevents oscillating or overcorrecting of the anti-stall assembly during rapid changes in the loading on the associated engine or prime mover. During steady state or slowly changing load conditions on the prime mover, the rate control assembly is ineffective to retard operation of the anti-stall assembly. This enables the anti-stall assembly to have a relatively high steady state sensitivity to small changes in the loading on the engine so that precise swash angle corrections can be made over a very narrow engine speed range. This permits the use of maximum engine power without overloading of the engine.

Accordingly, it is an object of this invention to provide a new and improved hydrostatic transmission control system which includes a rate control assembly which is effective to maintain relatively high steady state sensitivity of an anti-stall assembly while negating any oscillating or overcorrecting tendency by the anti-stall assembly during rapid changes in engine loading.

Another object of this invention is to provide a new and improved apparatus for controlling the operation of a hydrostatic transmission driven by a prime mover and wherein this apparatus includes an anti-stall assembly which is effective to reduce the output speed of the hydrostatic transmission upon the occurrence of an impending overloading of the prime mover and a rate control assembly which is operable to retard operation of the anti-stall assembly in response to a rapid variation in the loading on the prime mover.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS

Figure 1:
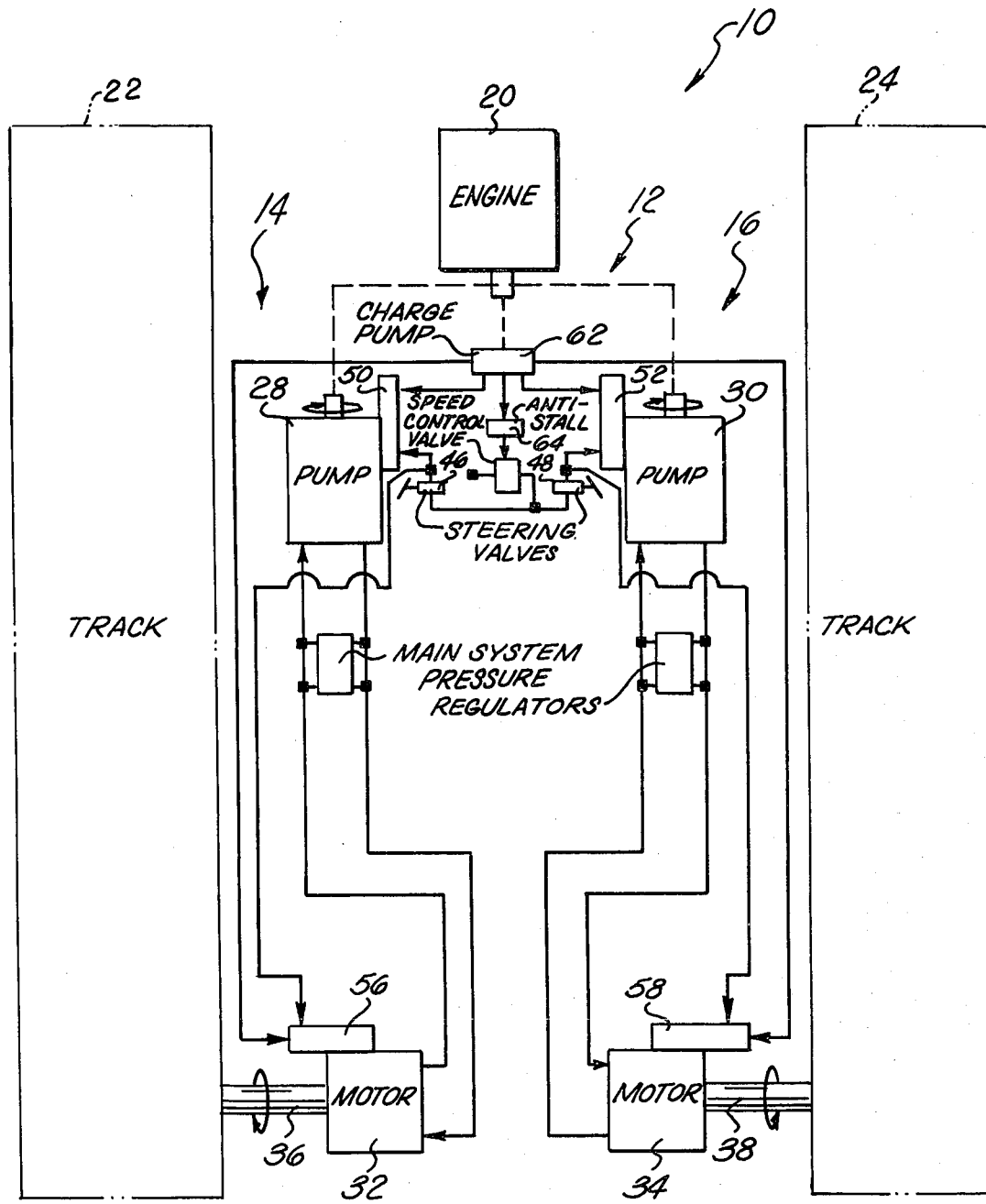
FIG. 1 is a schematic illustration of a vehicle having a hydrostatic transmission drive system.

A vehicle 10 having a hydrostatic transmission drive system 12 is illustrated in FIG. 1. The hydrostatic transmission drive system 12 includes left and right hand hydrostatic transmissions 14 and 16 which transmit drive forces from a common engine or prime mover 20 to left and right tracks 22 and 24 of the vehicle 10. The hydrostatic transmissions 14 and 16 include variable displacement pump units 28 and 30 which are driven by the engine 20 to transmit fluid under pressure to variable displacement motor units 32 and 34 which are drivingly connected with the track 22 and 24 by drive shafts 36 and 38.

When the vehicle 10 is driven along a straight path, the input and output speed ratios of the hydrostatic transmissions 14 and 16 are simultaneously changed by equal amounts upon operation of a speed control or pressure regulator valve 42 which is connected with the hydrostatic transmissions and the steering control valves 46 and 48. Assuming that the vehicle 10 is moving forwardly along a straight path at a relatively low speed, the speed control valve 42 can be operated to increase the control fluid pressure transmitted through the steering valves 46 and 48 to pressure-responsive pump actuator assemblies 50 and 52 to increase the effective displacement of the pump units 28 and 30 by equal amounts and thereby increase the forward speed at which the tracks 22 and 24 are driven. If the speed control valve 42 is operated to a sufficient extent, motor actuator assemblies 56 and 58 will decrease the effective displacement of the associated motor units 32 and 34 by equal amounts to further increase the speed at which the tracks 22 and 24 are driven.

If it is desired to turn the vehicle to either the left or right, one of the steering control valves 46 or 48 is actuated to reduce the output speed of the hydrostatic transmission 14 or 16 connected with the track 22 or 24 on the side toward which the vehicle tends to turn. Thus, if the vehicle 10 is to be turned toward the left, the steering control valve 46 is actuated to reduce the output speed of the hydrostatic transmission 14 and the speed of movement of the left track 22 relative to the hydrostatic transmission 16 and track 24. Similarly, if the vehicle is to be turned toward the right, the steering control valve 48 is actuated to reduce the output speed of the hydrostatic transmission 16 and the speed of the right track 24.

Control fluid is supplied to the speed control valve 42 from an engine driven charge pump 62 through antistall assembly 64. In the event of an impending overloading of the engine 20, the anti-stall assembly 64 effects a reduction in the pressure of the control fluid conducted to the speed control valve 42. This results in a reduction in the pressure of the control fluid ported to the pump and motor actuator assemblies 50, 52, 56, and 58 of the hydrostatic transmissions 14 and 16 to effect a corresponding reduction in the output speeds of the hydrostatic transmissions. The construction of the pump and motor actuator assemblies 50, 52, 56, and 58 and the manner in which they cooperate with the speed control valve 42 and the steering control valves 46 and 48 is the same as is disclosed in U.S. patent application Serial No. 248,685, filed April 28, 1972, by Edward J. Bojas and Harold R. Ward and entitled "Hydrostatic Transmission Drive System", now U.S. Pat. No. 3,795,109 issued Mar. 5, 1974. In order to avoid prolixity of description, the disclosure in the aforesaid Bojas and Ward application is incorporated herein by this reference thereto.

Figure 2:
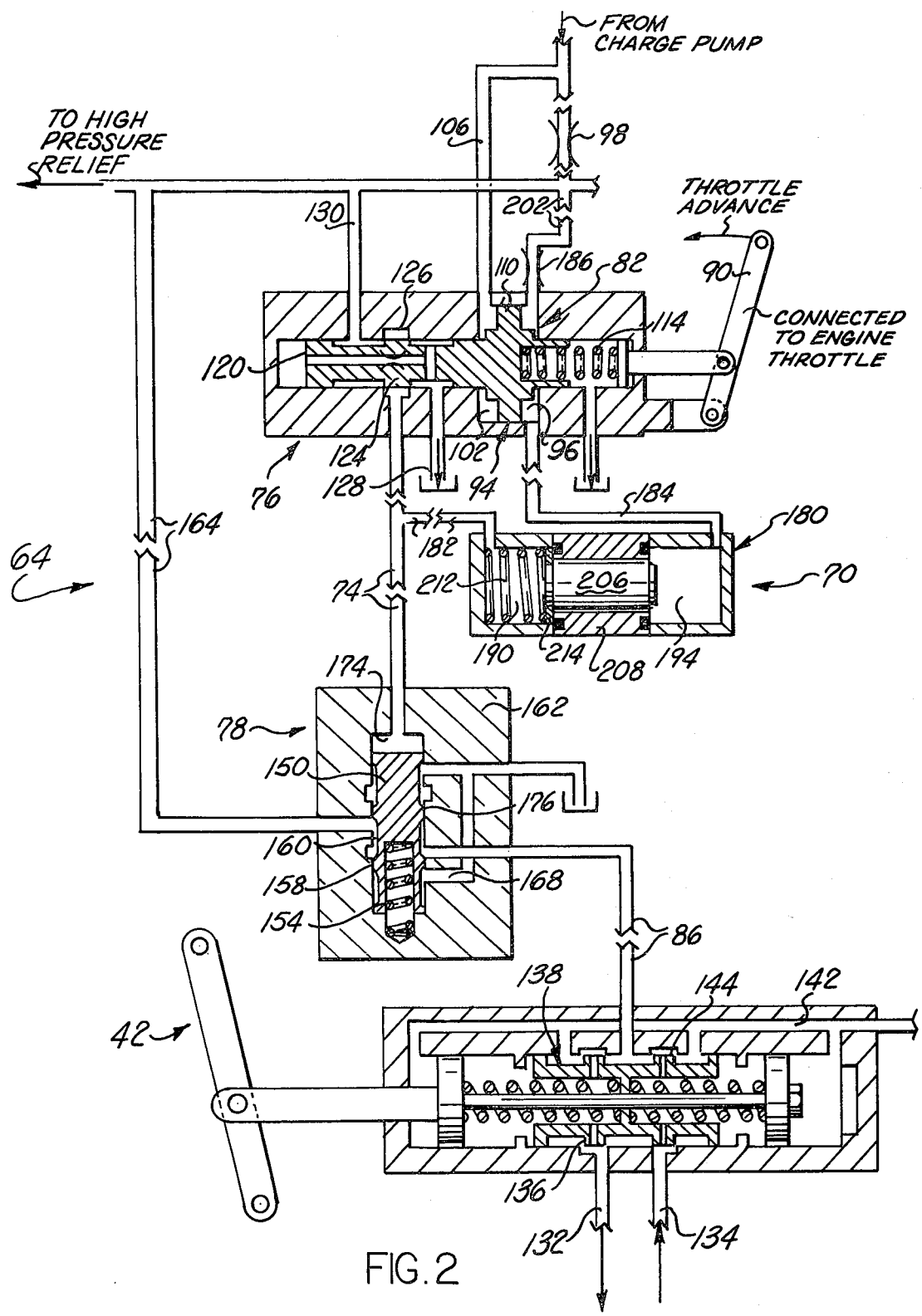
FIG. 2 is an enlarged schematic illustration depicting the relationship between an anti-stall assembly which prevents overloading of an engine which supplies power to the hydrostatic transmission drive system and rate control assembly which prevents oscillating or overcorrecting by the anti-stall assembly.

In accordance with the present invention, a rate control assembly 70 is connected with the anti-stall assembly 64 in the manner illustrated in FIG. 2. The rate control assembly 70 cooperates with the anti-stall assembly 64 during rapid changes in the load on the engine 20 to prevent oscillating or overcorrecting by the anti-stall assembly. The rate control assembly 70 accomplishes this without impairing the steady state sensitivity of the anti-stall assembly 64 so that precise corrections can be made in the output speeds of the hydrostatic transmissions 14 and 16 over a very narrow range of engine speed to permit the use of maximum engine power without overloading the engine.

The rate control assembly is actuated in response to rapid changes in fluid pressure conducted through a conduit 74 interconnecting a first stage anti-stall valve assembly 76 and a second stage anti-stall valve assembly 78. Actuation of the rate control assembly 70 provides a fluid output signal which retards operation of an actuator assembly 82 in the first stage anti-stall valve assembly. This retarding action prevents rapid fluctuations in the fluid pressure conducted from the anti-stall assembly 64 through a conduit 86 to the speed control valve 42 to thereby prevent oscillating or overcorrecting during rapid variations in the load applied to the engine 20.

ANTI-STALL ASSEMBLY

The first stage anti-stall valve assembly 76 is actuated to effect operation of the second stage anti-stall valve assembly 78 and a variation in the output speeds of hydrostatic transmissions 14 and 16 in response to a change in the output speed of the engine 20 from a speed corresponding to a setting of a throttle control lever 90. Thus, the actuator assembly 82 includes a piston and cylinder assembly 94 having a main chamber 96 which is connected with the charge pump 62 through a speed sensing orifice 98. As secondary chamber 102 is connected directly with the charge pump 62 through a conduit 106. During operation of the engine 20 at a speed corresponding to a setting on the throttle lever 90, there is a fluid pressure drop across the orifice 98 so that the pressure in the conduit 106 and secondary chamber 102 is greater than the fluid pressure in the main chamber 96. This fluid pressure differential across the piston 110 in the piston and cylinder assembly 94 is balanced by a biasing force which varies as a function of the setting of the throttle lever 90.

When the throttle lever 90 is advanced to a high speed setting, a relatively high fluid pressure is conducted from the charge pump 62 and through the conduit 106 to the secondary chamber 102. At this time, a relatively large pressure drop occurs across the orifice 98 so that the fluid pressure in the main chamber 96 is substantially less than the fluid pressure in the chamber 102. However, moving the throttle lever 90 to a position corresponding to a relatively high engine speed compresses a spring 14 to apply relatively high biasing force against the piston 110 to offset the relatively high fluid pressure in the secondary chamber 102 so that the piston 110 is balanced in the unactuated position shown in FIG. 2.

The charge pump 62 is driven directly from the engine 20 so that the pressure of the fluid supplied from the pump varies as a direct function of changes in engine speed. Of course, if the load on the engine 20 increases the speed of the engine decreases and if the load decreases, the engine speed increases. Thus, if the load on the engine 20 should decrease so that the engine speeds up, the fluid pressure conducted from the charge pump 62 through the conduit 106 to the secondary chamber 102 increases resulting in movement of the piston 110 toward the right, as viewed in FIG. 2, from the unactuated position. Similarly, if the load on the engine 20 should be increased, the output speed of the engine 20 decreases with a resulting decrease in the fluid pressure conducted through the conduit 106 to the secondary chamber 102. This results in movement of the piston 110 toward the left from the unactuated position of FIG. 2.

Movement of the piston 110 from the unactuated position of FIG. 2 results in actuation of a primary valve 120 in the first stage anti-stall valve assembly 76 to vary the fluid pressure in the conduit 74 and effect operation of the second stage anti-stall valve assembly 78. Thus, when the piston 110 is moved toward the right from the unactuated position shown in FIG. 2 in response to an increase in output speed of the engine 20 and an increase in pressure in the secondary chamber 102, an annular land 124 on the valve spool 120 is moved out of sealing relationship with an annular outlet groove 126 so that high pressure fluid supplied by the charge pump 62 can flow from the conduit 130 to the conduit 74 and the secondary anti-stall valve assembly 78. Similarly, when the piston 110 is moved toward the left from the unactuated position of FIG. 2, in response to an increase in the load on the engine 20, the annular land 124 is moved away from the outlet groove 126 to connect the conduit 74 with drain through a passage 128 and reduce the fluid pressure conducted through the conduit 74 to the secondary anti-stall valve assembly 78.

The second stage anti-stall valve assembly 78 regulates the fluid pressure conducted through the conduit 86 to the speed control valve 42. The speed control valve 42 is kept in continuous fluid communication with the pump and motor actuator assemblies 50, 52 56 and 58 (see FIG. 2) through conduits 132 and 134. When the speed control valve 42 is in the forward actuated position, illustrated in FIG. 2, the conduit 132 is connected in continuous fluid communication with the conduit 86 around an annular land 136 on a valve spool 138 and the conduit 134 is connected in continuous communication with a drain passage 142 around an annular land 144. Similarly, when the speed control valve 42 is disposed in a reverse actuated condition, the conduit 132 is connected in continuous fluid communication with the drain passage 142 while the conduit 134 is connected in continuous fluid communication with the conduit 86 around an annular land 144. The speed control valve 42 continuously modulates the fluid pressure conducted to the pump and motor actuator assemblies 50, 52, 56 and 58 in the manner described in the aforementioned U.S. application Ser. No. 248,685, filed Apr. 28, 1972 by Edward J. Bojas and Harold R. Ward and entitled Hydrostatic Transmission Drive System now U.S. Pat. No. 3,795,109, issued Mar. 5, 1974.

The second stage anti-stall valve assembly 78 is actuated in response to operation of the first stage anti-stall valve assembly 76 to vary the fluid pressure conducted through the conduit 86 to the speed control valve 42. The second stage anti-stall valve assembly 78 includes a pressure actuated valve 150 which is biased by a spring 154 away from the open or actuated position of FIG. 2 to a closed or unactuated position.

When the valve 150 is closed, an annular valve land 158 cooperates with a cylindrical surface 160 of a housing 162 to block a flow of fluid under pressure from the conduit 164 to the conduit 86. In addition, when the valve 150 is closed, the conduit 86 is connected with a drain passage 168. The valve 150 is moved from the closed position to the open position of FIG. 2 under the influence of fluid pressure in a chamber 174. When the valve 150 is open, fluid under pressure can flow from the conduit 164 between lands 158 and 176 to the conduit 86.

During forward operation of the vehicle, closing of the valve 150 to connect the conduit 86 with the drain passage 168 reduces the fluid pressure conducted through the conduit 86 to the pump and motor actuator assemblies 50, 52, 56 and 58. This reduction in fluid pressure effects operation of the pump and motor actuator assemblies 50, 52, 56 and 58 to reduce the output speeds of the hydrostatic transmission 14 and 16. Similarly, when the secondary valve 150 is operated to the open position shown in FIG. 2, under the influence of fluid pressure conducted to the pressure chamber 174 through the conduit 74, the conduit 86 is connected with the pressure supply conduit 164. During forward operation of the vehicle 10, this results in a relatively high pressure fluid being conducted through the conduit 132 to the pump and motor actuator assemblies 50, 52, 56 and 58 so that the hydrostatic transmissions 14 and 16 have an output speed corresponding to the setting of the speed control valve 42.

During normal forward operation of the vehicle 10, the first and second stage anti-stall valve assemblies 76 and 78 and the control valve assembly 42 will be in the condition shown in FIG. 2. At this time, fluid pressure is continuously conducted from the conduit 164 through the second stage anti-stall valve assembly to the conduit 86 and speed control valve 42.

If the load on the engine 20 should increase to an extent such that there is an impending stalling of the engine, the first stage anti-stall valve assembly 76 is actuated to decrease the fluid pressure in the conduit 74 so that the second stage anti-stall valve assembly 78 is actuated from the open condition of FIG. 2 to the closed position connecting the conduit 86 with drain. Connecting the conduit 86 with drain reduces the fluid pressure conducted from the speed control valve 42 to the pump and motor actuator assemblies 50, 52, 56 and 58. This results in a corresponding decrease in the output speeds of the hydrostatic transmissions 14 and 16 to thereby reduce the load on the engine 20.

The first stage anti-stall valve assembly is actuated in response to the occurrence of an impending overloading of the engine 20. Thus, as the load on the engine 20 is increased from a normal load condition toward an overload condition, the engine 20 slows down relative to the throttle setting 90. This results in a reduction in the pressure in the fluid conduit 106 and chamber 102 so that the piston 110 is moved from the unactuated position by the spring 114. This movement of the piston 110 connects the conduit 74 with the drain passage 128 around the valve land 124. The resulting reduction in fluid pressure in the chamber 174, in the second stage anti-stall valve assembly 78, enables the biasing spring 154 to move the valve spool 150 to the closed position connecting the conduit 86 with the drain passage 168. This effects a decrease in the forward speed of the hydrostatic transmissions 14 and 16 and the load on the engine 20 in the manner previously explained.

When the load on the engine 20 is reduced to such an extent that it can resume an operating speed corresponding to the setting of the throttle lever 90 without danger of stalling, the output speed of the engine 20 will increase. This also increases the pressure at which fluid is discharged from the charge pump 62 to the conduit 106. The resulting increase in fluid pressure in the conduit 106 moves the piston 110 toward the right (as viewed in FIG. 2) from the leftward actuated position to which it was operated in response to an impending overloading on the engine 20. The piston moves through the unactuated position of FIG. 2 to a rightward actuated position (as viewed in FIG. 2) in which the fluid supply conduit 130 is connected with the conduit 74. This results in an increase in fluid pressure in the chamber 174 so that the valve 150 is moved back to the open position shown in FIG. 2.

When the valve spool 150 is in the open position, fluid pressure in the conduit 164 is communicated to the conduit 86 and through the speed control valve 42 to the pump and motor actuator assemblies 50, 52, 56 and 58. The resulting increase in the fluid pressure connected to the pump and motor actuator assemblies increases the output speeds of the hydrostatic transmissions 14 and 16 and the load on the engine 20 until it again assumes a normal operating speed and the piston 110 is in the unactuated position in FIG. 2. The manner in which the anti-stall assembly 64 cooperates with the speed control valve 42 is generally similar to that set forth in U.S. application Ser. No. 237,086, filed Mar. 22, 1972 by Edward J. Bojas and entitled Hydrostatic Transmission Control System.

When the vehicle 10 encounters a sudden change in load, there is a relatively rapid drop in engine speed and pressure in the conduit 106. This rapid drop in pressure in conduit 106 results in a relatively large pressure differential across the piston 110 so that the throttle biasing spring 114 is effective to move the valve 20 quickly toward a fully open position. This rapid response of the anti-stall system 64 could result in an excessive reduction in the output speeds of the hydrostatic transmissions 14 and 16. The excessive reduction in the output speeds of the hydrostatic transmissions 14 and 16 would then be corrected by rapid speeding up of the engine 20 and a rapid increase in the fluid pressure in the conduit 106. The piston 110 would then be moved quickly toward the right (as viewed in FIG. 2) to quickly increase the fluid pressure in the conduit 74 and increase the output speeds of the hydrostatic transmissions 14 and 16. The resulting oscillation or overshooting impairs the ability of the anti-stall system 64 to make precise corrections in the output speeds of hydrostatic transmissions 14 and 16 over a very narrow range of engine speed to allow the use of maximum engine power without stalling the engine 20.

THE RATE CONTROL ASSEMBLY

The rate control assembly 70 cooperates with the anti-stall system 64 to retard operation of the anti-stall system in response to rapid changes in the load on the engine 20. To this end, the rate control assembly 70 is actuated in response to rapid fluctuations in the fluid pressure in the conduit 74. Actuation of the rate control assembly 70 provides a fluid output signal to the chamber 96 of the actuator assembly 82 to retard operation of the first stage anti-stall valve assembly 76.

The rate control assembly 70 includes a piston and cylinder assembly 180 which is connected in fluid communication with the conduit 74 by a conduit 182. The piston and cylinder assembly 180 is connected in fluid communication with the main chamber 96 of the actuator assembly 82 by a conduit 184. The rate control assembly 70 includes a rate control orifice 186 which is effective to prevent excessive rates of fluid flow to and from the main chamber 96 of the actuator assembly 82.

During normal operation of the engine 20, that is in the absence of an impending stalling of the engine, the rate control assembly 70 is ineffective. At this time, a sensing chamber 190 in the rate control assembly 70 contains fluid at the same pressure as the conduit 74. In addition, an output chamber 194 of the rate control assembly 70 contains fluid at the same pressure as the main chamber 96 of the actuator assembly 82.

During normal operation of the engine 20, the fluid pressure in the sensing chamber 190 is substantially equal to the fluid pressure in the output chamber 194 of the rate control assembly 70. This is because the conduit 74 and the main chamber 96 of the actuator assembly 82 are both connected with the downstream side of the speed sensing orifice 98.

Upon a sudden overloading of the engine 20 so that an impending stall becomes quickly present, the output speed of the engine is rapidly decreased with a resulting rapid decrease in the fluid pressure in the conduit 106 and secondary chamber 102 relative to the fluid pressure in the main chamber 96. This results in relatively rapid initial movement of the piston 110 toward the left from the unactuated position of FIG. 2 to quickly connect the conduit 74 with drain. The resulting rapid decrease in the fluid pressure in the conduit 74 is communicated to the sensing chamber 190 in the rate control assembly 70. The decrease in fluid pressure in the sensing chamber 190 causes a piston 206 to move toward the left (as viewed in FIG. 2) in a cylinder 208 under the influence of the relatively high fluid pressure in the output chamber 194. Of course, expansion of the output chamber 194 results in a decrease in the fluid pressure in the chamber.

The decrease in the fluid pressure in the output chamber 194 is transmitted through the conduit 184 to the main chamber 96 of the actuator assembly 82. This results in fluid flow into the main chamber 96 through the rate control orifice 186. In addition, fluid flows from the main chamber 96 to the output chamber 194. The rate control orifice 186 has a smaller throat diameter than the speed sensing orifice 98. This prevents a rapid flow of fluid from a conduit 202 to the main chamber 96. Therefore, the fluid pressure in the output chamber 194 and the main chamber 96 is reduced when the piston 206 is moved quickly toward the left (as viewed in FIG. 2).

Reducing the fluid pressure in the main chamber 96 at the same time the fluid pressure is reduced in the chamber 102 decreases the fluid pressure differential across the piston 110 to retard the operation of the actuator assembly 82. Therefore, the valve assembly 76 is slowly actuated toward the open condition to effect a relatively slow decrease in the fluid pressure in the conduit 74. This results in a deliberate or regulated reduction in the output speed of the hydrostatic transmissions 14 and 16 to thereby prevent overshooting or oscillating of the anti-stall assembly 64.

When the output speed of the hydrostatic transmissions 14 and 16 have been reduced by an extent sufficient to eliminate the impending overloading or stalling of the engine 20, the fluid pressure in the conduit 74 is at a relatively low level so that the second stage anti-stall valve assembly 78 effects a modulated reduction in the fluid pressure transmitted through the conduit 86 to the speed control valve 42. At this time, the piston 206 will have moved towards the left (FIG. 2) from its normal position. This is due to the fact that the relatively low fluid pressure in the sensing chamber 190 and the somewhat higher fluid pressure in the chamber 194 will cause the piston 206 to move toward the left (as viewed in FIG. 2) against the influence of a biasing spring 212 which is compressed by a washer 214 as the piston 206 moves into the sensing chamber 190.

As the load on the engine 20 is subsequently reduced, the anti-stall assembly 64 is again operated to increase the pressure in the conduit 74 leading to the second stage anti-stall valve assembly 78 and effect an increase in the fluid pressure transmitted to the conduit 86. If the load on the engine 20 is rapidly reduced, there is a tendency for the anti-stall assembly 64 to overcorrect so that the output speeds of the hydrostatic transmissions 14 and 16 will be increased by too large an amount.

To prevent overcorrecting by the anti-stall assembly 64, in response to a rapid reduction in the load on the engine 20, the rate control assembly 70 retards operation of the first stage anti-stall valve assembly 76. Thus, as the speed of the engine 20 quickly increases in response to a rapid decrease in the load on the engine, the fluid pressure in the conduit 106 quickly increases relative to the fluid pressure in the main chamber 96. This results in movement of the piston 110 toward the right (as viewed in FIG. 2). This rightward movement of the piston 110 connects the conduit 74 with the fluid supply conduit 130 so that the fluid pressure in the conduit 74 is rapidly increased.

The increased fluid pressure in the conduit 74 is transmitted to the sensing chamber 190 in the rate control assembly 70 to return the piston 206 to its normal position from the previous leftward (as viewed in FIG. 2) actuated position. This rightward movement of the piston 206 increases the fluid pressure in the output chamber 194. The increased fluid pressure in the output chamber 194 results in fluid flow from the output chamber through the conduit 184 toward the main chamber 96.

Since the rate control orifice 186 has a relatively small throat diameter, the flow of fluid from the output chamber 94 increases the pressure in the main chamber 96. This increase in the fluid pressure in the chamber 96 prevents rapid changes in the fluid pressure differential between the chambers 96 and 102. Therefore, rightward movement (in FIG. 2) of the piston 110 is retarded so that the fluid pressure in the conduit 74 is gradually increased with a modulating action. Of course, as the piston 206 reaches the centered or normal position shown in FIG. 2, the fluid flow from the output chamber 194 ceases.

If the vehicle 10 encounters operating conditions which quickly reduce the load on the engine 20, the output speed of the engine quickly increases with a resulting rapid increase in the fluid pressure discharged from the charge pump 62. The increased fluid pressure from the charge pump 62 is conducted through the conduit 106 to the secondary chamber 102. Of course, this results in movement of the piston 110 toward the right (as viewed in FIG. 2) to open the valve 120 so that fluid can flow from the conduit 130 to the conduit 74. The resulting increase in fluid pressure in the conduit 74 is conducted through the conduit 182 to the sensing chamber 190 in the rate control assembly 70.

To prevent overcorrecting by the anti-stall assembly 64 in response to the rapid reduction in the load on the engine 20, the rate control assembly 70 responds to the increased fluid pressure in the sensing chamber 190 by discharging fluid to the main chamber 96 in the actuator assembly 82. Thus as the fluid pressure in the sensing chamber 190 increases, the piston 206 in the rate control assembly 70 moves toward the right (as viewed in FIG. 2). The resulting increase in the fluid pressure in the output chamber 194 induces a flow of fluid through the conduit 184 to the main chamber 96. Since the rate control orifice 186 retards fluid flow from the main chamber 96, the fluid pressure in the main chamber 96 increases to thereby retard operation of the anti-stall assembly 64 under the influence of the increasing pressure in the secondary chamber 102. Although only a single biasing spring 212 has been illustrated it is contemplated that a second biasing spring, similar to the spring 212, could be provided in the output chamber 194.

As the fluid pressure in the conduit 74 increases, the valve 150 enables fluid to flow from the conduit 164 to the conduit 86 to increase the fluid pressure conducted to the pump and motor actuator assemblies 50, 52, 56 and 58 through the speed control valve 42. This increase in fluid pressure results in operation of the actuator assemblies 50, 52, 56 and 58 to increase the output speeds of the hydrostatic transmissions 14 and 16. As the output speeds of the hydrostatic transmissions 14 and 16 increase, the load on the engine 20 increases to thereby reduce the output speed of the engine and the fluid pressure conducted through the conduit 106 to the secondary chamber 102. This results in movement of the piston 110 to the unactuated position shown in FIG. 2 in the manner previously explained.

When the load on the engine 20 is subsequently increased, the speed of the engine 20 is reduced with a resulting reduction in the fluid pressure conducted to the secondary chamber 102. As this occurs, the piston 110 moves toward the left (as viewed in FIG. 2). This operates the valve 120 to connect the conduit 74 with the drain conduit 128 and reduce the fluid pressure in the conduit 74. Reduction of fluid pressure in the conduit 74 causes the valve 150 to connect the conduit 86 with the drain conduit 168 to thereby effect a reduction in the fluid pressure transmitted from the speed control valve 42 to the pump and motor actuator assemblies 50, 52, 56 and 58.

The reduction in fluid pressure in conduit 74 causes the piston 206 to move to the left. It should be noted that the pressure in conduit 74 is always equal to or less than the pressure in the conduit 184 and chamber 194. If the load on the engine 20 is rapidly increased, the piston 206 quickly moves to the left against spring 212 to reduce the fluid pressure in the chamber 194. This would result in a flow of fluid from the main chamber 96 and a decrease in the fluid pressure in the main chamber to offset the rapidly decreasing fluid in the pressure in the secondary chamber 102. Of course, this would retard operation of the anti-stall assembly 64 to prevent overcorrecting.

During relatively slow changes in the load on the engine 20, the rate control assembly is ineffective. This is because the rate control orifice 186 can accommodate a relatively slow rate of fluid flow to and from the main chamber 96. Thus if the load on the engine 20 is gradually increased, a gradual change in pressure will be established between the main secondary chambers 102 with a relatively slow or modulated decrease in the fluid pressure in the conduit 74. This will result in movement of the piston 206 toward the left, from the normal position shown in FIG. 2, at a relatively slow rate which can be accommodated by a fluid flow through the rate control orifice 186. Therefore, the fluid pressure in the main chamber 96 will not be significantly reduced by fluid flow to the output chamber 194 of the rate control assembly 70.

Similarly, if the anti-stall system 64 is actauted to slowly increase the output speed of the hydrostatic transmissions 14 and 16 to output speeds corresponding to the setting of the throttle lever 90 as the load on the engine 20 is slowly decreased, the pressure in the conduit 106 and secondary chamber 102 is slowly increased relative to the pressure in the main chamber 96. This results in a slow or modulated movement of the piston 110 to actuate the valve assembly 120 to gradually increase the fluid pressure in the conduit 74. The gradual increase in fluid pressure in the conduit 74 results in a relatively slow rightward movement (FIG. 2) of the piston 206 from its leftward actuated position. This slow movement of the piston 206 results in a relatively slow discharge of fluid from the output chamber 194.

The relatively slow discharge of fluid from the output chamber 194 can be accommodated by the rate control orifice 186 without increasing the fluid pressure in the main chamber 96. Therefore, during relatively slow change in the load on engine 20, the rate control assemby 70 is ineffective to retard operation of the anti-stall assembly 64. This enables the anti-stall assembly 64 to precisely and deliberately correct for gradual changes in the loading on the engine 20 and thereby make precise changes in the output speeds of the hydrostatic transmission 14 and 16 so that maximum engine power is utilized without overloading the engine. However, the rate control assembly 70 is effective during rapid changes in the loading of the engine 20 to prevent overshooting or oscillating due to overcorrecting on the part of the anti-stall assembly 64.

In the embodiment of the invention illustrated in FIG. 2 the rate control assembly 70 is effective to retard operation of the anti-stall assembly in response to rapid variations in engine loading. However if the engine is subjected to a relatively large variation in load, the rate control assembly 70 may prevent the anti-stall assembly 64 from responding until after a substantial momentary decrease has occurred in engine operating speed. Under certain conditions this may be objectionable. Therefore, in the embodiment of the invention illustrated in FIG. 3 the rate control assembly is ineffective to retard operation of the anti-stall assembly upon the occurrence of a relatively large variation in engine loading. Since the embodiment of the invention illustrated in FIG. 3 has many components which have the same construction and mode of operation as the components of the embodiment of the invention illustrated in FIG. 2, similar numerals will be utilized to designate similar components, the suffix letter *a* being added to the numerals associated with FIG. 3 to avoid confusion.

An anti-stall assembly 64*a* is supplied with fluid through a conduit 250 connected with the charge pump 62. A rate control assembly 70*a* is connected with the anti-stall assembly 64*a* in the same manner as the rate control assembly 70 and prevents oscillating or overcorrecting by the anti-stall assembly 64*a* in response to rapid and relatively small changes in engine operating speed. The anti-stall assembly 64*a* and rate control assembly 70*a* are connected by a conduit 74*a* with a second stage anti-stall valve assembly (not shown) of the same construction as the second state anti-stall assembly 78 of FIG. 2. In addition, the second stage anti-stall valve assembly is connected with the conduit 250 and the charge pump 62 through a speed sensing orifice 98*a* and a conduit 164*a*. The second stage anti-stall valve assembly is connected with a speed control valve (not shown) of the same construction as the speed control valve 42 of FIG. 2.

An actuator assembly 82*a* in a first stage anti-stall valve assembly 76*a* is connected in series with the speed sensing orifice 98*a* through a rate control orifice 186*a*. The actuator assembly 82*a* is connected with a throttle control lever 90*a* which is movable to change the speed at which the engine 20 drives the hydrostic transmissions 14 and 16.

Figure 3:
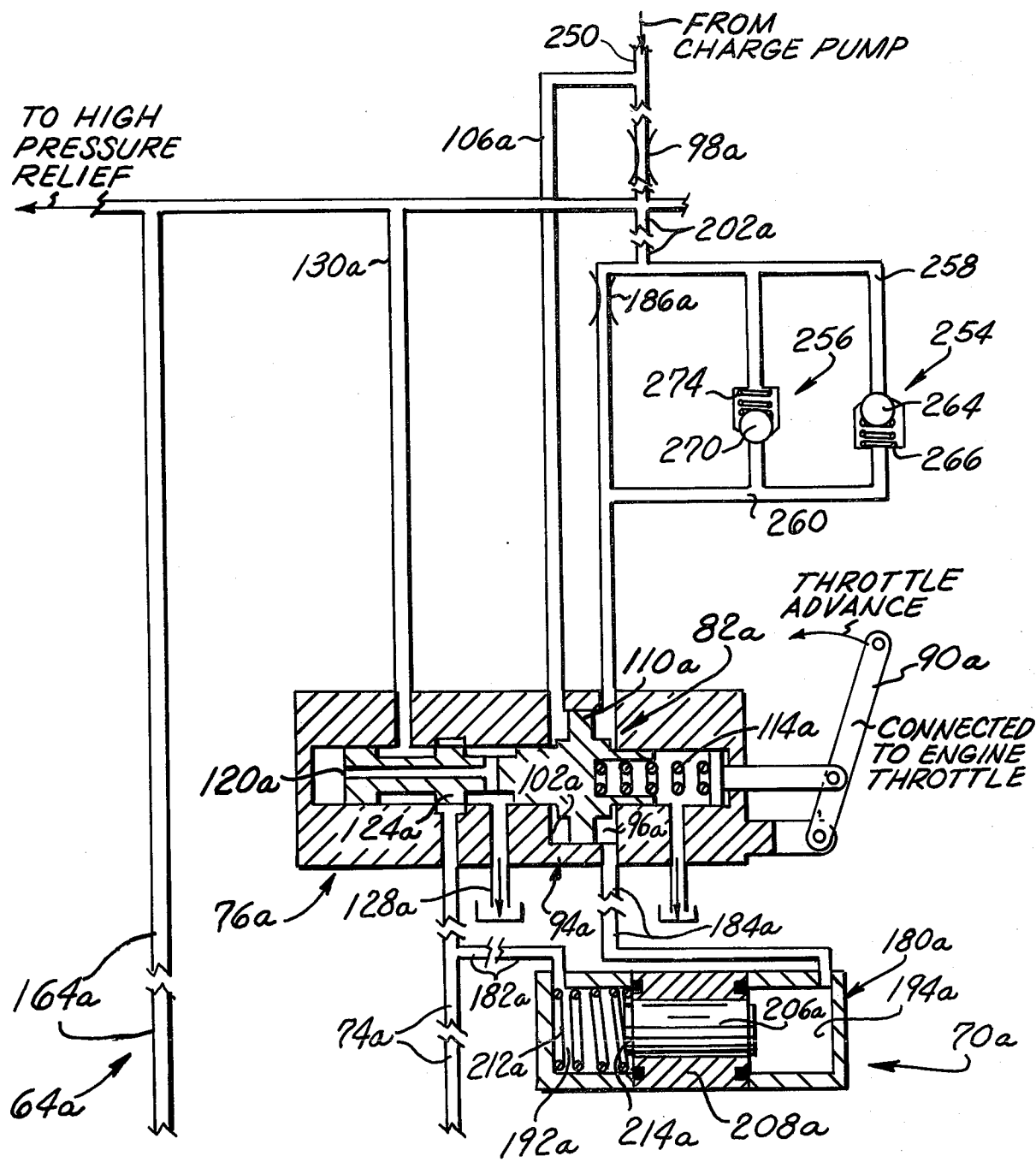
FIG. 3 is a schematic illustration, generally similar to FIG. 2, of a second embodiment of the invention which renders the rate control assembly ineffective upon the occurrence of a relatively large variation in engine loading.

In accordance with one feature of the embodiment of the invention illustrated in FIG. 3, a pair of rate control limit check valves 254 and 256 are provided to render the rate control assembly 70*a* ineffective to retard operation of the anti-stall valve assembly 64*a* when the magnitude of the change in the load on the engine 20 is in excess of a predetermined amount. The check valve 254 is effective to bypass fluid around the rate control orifice 186a through conduits 258 and 260 when the fluid pressure differential across the rate control orifice 186 is of a sufficient magnitude to move a spherical ball valve 264 against the influence of a biasing spring 266. It is contemplated that the spring 266 could be sized in such a manner as to limit the pressure differential across the orifice 186*a* to approximately one or two pounds per square inch. Though this may seem to be a very small differential, it may amount to from 20 percent to 40 percent of the maximum anti-stall sensing pressure differential.

During relatively small rapid variations or oscillations in the output speed of the engine 20, there is a very small change in the pressure across the orifice 186*a*. Under these conditions the spring 266 is effective to hold the check valve ball 264 in the closed position (illustrated in FIG. 3) blocking fluid flow from the upstream side of the orifice 186*a* through conduit 258, check valve 254 and conduit 260 to the down stream side of the rate control orifice 186*a*. Of course, fluid pressure urges a ball 270 of the check valve assembly 256 to the closed position. Therefore, the rate control assembly 70*a* is effective to retard operation of the anti-stall valve assembly 64*a* in the manner previously explained.

If a load of a relatively large magnitude is rapidly applied to the engine 20, the fluid pressure transmitted through the relatively large diameter throat of the speed sensing orifice 98*a* to the upstream side of the rate control orifice 186*a* will be larger than the fluid pressure in conduit 260 transmitted through the relatively small diameter throat of the rate control orifice 186*a* to the downstream side of the rate control orifice due to flow into chamber 194*a* of the rate control assembly 70*a*. The relatively large pressure differential across the rate control orifice 186*a* results in movement of the check valve ball 264 to an open position against influence of the biasing spring 266.

Upon opening of the check valve 254, fluid can flow through the conduit 258 and 260 to the actuator assembly 82*a*. Fluid from a chamber 96*a* of the actuator assembly 82*a* is conducted through a conduit 184*a* to a chamber 194*a* of the rate control assembly 70*a*. Therefore piston 206*a* is rapidly moved against the influence of a biasing spring 212*a* to discharge fluid through a conduit 182*a* to the conduit 74*a* until the pressure and spring forces acting on member 206*a* are balanced. Of course, this results in rapid actuation of the first and second stage anti-stall valve assembly until the pressure differential reaches the check valve setting to quickly reduce the fluid pressure conducted from the speed control valve to pump and motor actuator assemblies 50, 52, 56, and 58 to rapidly effect a decrease in output speeds of the hydrostatic transmissions 14 and 16 and a reduction in the load on the engine 20 before the engine speed is substantially reduced. Once the pressure differential in conduits 260a and 202a reach the check valve setting pressure, the rate control 70a and orifice 186a are again effective to limit the rate of anti-stall operation.

When the load on the engine 20 is suddenly decreased by a relatively large amount, the check valve 256 is opened to bypass fluid from the actuator assembly 82a around the rate control orifice 186a to the conduit 202a. When the load on the engine 20 is rapidly decreased by a substantial amount, the fluid pressure from the charge pump quickly increases with increasing engine speed. Therefore, the fluid pressure transmitted through a conduit 106a to the actuator assembly 82a quickly increases. This results in an increase in the fluid pressure transmitted to the rate control limit check valve 256 to move the spherical ball valve 270 against the influence of a biasing spring 274. As this occurs, fluid flow is bypassed around the rate control orifice 186a. Therefore, the fluid pressure in a chamber 96a of the actuator assembly 82a increases only by the amount required to unseat check valve 256 thereby resulting in a rapid shifting of a primary valve 120a to port high pressure fluid down through the second stage anti-stall valve assembly through the conduit 74a until the pressure differential reaches the check valve setting. Once the pressure differential in conduits 260a and 202a reach the check valve setting pressure, the ratio control 70a and orifice 186a are again effective to limit the rate of anti-stall operation. This results in an increase in the displacements of the hydrostatic transmissions and the load on the engine.

Thus in the embodiment of the invention illustrated in FIG. 3, the rate control limit check valves 254 and 256 are connected in parallel with the rate control orifice 186a to render the rate control assembly 70a ineffective to retard operation of the anti-stall valve assembly 64a when the magnitude of the change in the load applied to the engine 20 exceeds a magnitude determined by the biasing spring in one of the check valves. However, when the magnitude of the change in the load on the engine 20 is insufficient to cause one of the check valves 254 or 256 to open against the influence of its biasing spring, the rate control assembly 70a is effective to retard operation of the anti-stall valve assembly 64a in response to rapid variations in relatively small loads on the engine 20 in the manner previously explained in connection with FIG. 2. Although two rate control limit check valves 254 and 256 have been utilized in the embodiment of the invention illustrated in FIG. 3, it should be understood that either one of the check valves and its function could be eliminated. For example, if an increase in engine speed with a relatively large reduction in load is not objectionable, the check valve 256 could be eliminated.

In view of the foregoing description, it is apparent that the rate control assembly 70 interacts with the anti-stall assembly 64 to prevent overcorrecting for rapid changes in the loading of the engine 20. The rate control assembly 70 senses rapid fluctuations in the pressure in the conduit 74 and, in response thereto, provides a fluid output signal which retards operation of the anti-stall assembly 64. Thus, when the actuator assembly 82 is activated by an increase in the fluid pressure in the main chamber 96, the rate control assembly 70 accepts fluid from the main chamber to retard the build-up of fluid pressure in the main chamber. Similarly, when the actuator assembly 82 is activated by a decrease in the fluid pressure in the main chamber 96, the rate control assembly 70 discharges fluid to the main chamber to retard the reduction of fluid pressure in the main chamber.

During steady state or slowly changing load conditions on the engine 20, the rate control assembly 70, is ineffective to retard operation of the anti-stall assembly 64. This is because the rate control orifice 186 allows fluid to flow to and from the main chamber 96 at a relatively low rate. This enables the anti-stall assembly 64 to have a relatively high steady state sensitivity to small changes in the loading on the engine 20.

Having described a specific preferred embodiment of the invention the following is claimed:

1. An apparatus for controlling the operation of a hydrostatic transmission driven by a prime mover and having a variable displacement hydrostatic unit, said apparatus comprising motor means for varying the displacement of the hydrostatic unit and the output speed of the hydrostatic transmission, anti-stall means for effecting operation of said motor means to vary the displacement of the hydrostatic transmission upon the occurrence of an impending overloading of the prime mover, and rate control means for retarding operation of said anti-stall means in response to a rapid increase in the loading of the prime mover.

2. An apparatus as set forth in claim 1 wherein said rate control means further includes orifice means for limiting the rate of fluid flow between said anti-stall means and said rate control means.

3. An apparatus as set forth in claim 2 wherein said rate control means includes conduit means for conducting fluid from an upstream side of said orifice means to a downstream side of said orifice means and valve means operable from a closed condition blocking fluid flow through said conduit means to an open condition enabling fluid to flow through said conduit means in response to a predetermined pressure differential between the upstream and downstream sides of said orifice means.

4. An apparatus for controlling the operation of a hydrostatic transmission driven by a prime mover and having a variable displacement hydrostatic unit, said apparatus comprising fluid motor means for varying the displacement of the hydrostatic unit and the output speed of the hydrostatic transmission in response to a change in fluid pressure conducted to said fluid motor means, control means for directing fluid under pressure to said fluid motor means, anti-stall means operable from a first condition to a second condition to effect a change in the pressure of the fluid conducted to said motor means and operation of said motor means to reduce the output speed of the hydrostatic transmission in response to the occurrence of an impending overloading of the prime mover, said anti-stall means being operable from the second condition to the first condition to effect a change in the pressure of the fluid conducted to said motor means and operation of said motor means to increase the output speed of the hydrostatic transmission in response to a relieving of the impending overloading of the prime mover, and rate control means for providing an output to retard operation of said anti-stall means between the first and second conditions in response to rapid changes in the loading of the prime mover.

5. An apparatus for controlling the operation of a hydrostatic transmission driven by a prime mover and having a variable displacement hydrostatic unit, said apparatus comprising motor means for varying the displacement of the hydrostatic unit and the output speed of the hydrostatic transmission, anti-stall means for effecting operation of said motor means to vary the displacement of the hydrostatic transmission upon the occurrence of an impending overloading of the prime mover, and rate control means for retarding operation of said anti-stall means in response to a rapid variation in the loading of the prime mover, said anti-stall means including a first valve assembly, a second valve assembly, conduit means for conducting fluid pressure from said first valve assembly to said second valve assembly, said first valve assembly including a first valve member and means for actuating said first valve member upon the occurrence of an impending overloading of the prime mover to vary the fluid pressure conducted by said conduit means to said second valve assembly, said second valve assembly including a second valve member and means for actuating said second valve member in response to a variation in the fluid pressure in said conduit means.

6. An apparatus as set forth in claim 5 wherein said means for actuating said first valve member includes a cylinder, a piston disposed within said cylinder and cooperating therewith to define a first chamber connected in fluid communication with said conduit means and a second chamber connected in fluid communication with said means for actuating said first valve member, said piston being movable under the influence of fluid pressures in said first chamber to decrease the size of said second chamber and induce a flow of fluid from said rate control means to said means for actuating said first valve member, said piston being movable under the influence of pressure in said second chamber to increase the size of said second chamber and induce a flow of fluid to said rate control means from said means for actuating said first valve member.

7. An apparatus as set forth in claim 4 wherein said anti-stall means includes means for providing a first and second fluid pressures, means for varying the magnitude of said first fluid pressure relative to said second fluid pressure as a function of variations in the operating speed of the prime mover, and means for effecting operation of said anti-stall means between the first and second conditions in response to variations in the difference between said first and second fluid pressures, said rate control means including means for providing a fluid pressure signal opposing variations in said first fluid pressure relative to said second fluid pressure in response to fluctuations in the difference between said first and second fluid pressures.

8. An apparatus as set forth in claim 7 wherein said means for effecting operation of said anti-stall means between said first and second conditions includes first and second expansible chambers, means for conducting said first fluid pressure to said first expansible chamber, means for conducting said second fluid pressure to said second expansible chamber, said first and second expansible chambers being interconnected in such a manner that expansion of said first expansible chamber under the influence of said first fluid pressure contracts said second expansible chamber and expansion of said second expansible chamber under this influence of said second fluid pressure contracts said first expansible chamber, valve means connected with said first and second expansible chambers for effecting changes in the fluid pressure conducted to said motor means in response to expansion and contraction of said first and second expansible chambers, said rate control means including means for providing a fluid pressure signal tending to increase the fluid pressure in said second expansible chamber in response to an increase in said first fluid pressure relative to said second fluid pressure and for providing a fluid pressure signal tending to decrease the fluid pressure in said second expansible chamber in response to a decrease in said first fluid pressure relative to said second fluid pressure.

9. An apparatus as set forth in claim 4 wherein said rate control means includes means for discharging fluid to said anti-stall means during an impending overloading of the prime mover and for accepting fluid from said anti-stall means during a relieving of an impending overloading of the prime mover.

10. An apparatus as set forth in claim 4 wherein said anti-stall means includes valve mean operable between first and second positions to effect a change in the fluid pressure conducted to said motor means, expandable chamber means for effecting operation of said valve means between said first and second positions upon expansion and contraction of said expandable chamber means, and conduit means for conducting fluid to and from said expandable chamber means to effect expansion and contraction of said expandable chamber means and operation of said valve means between the first and second positions, said rate control means including means for discharging fluid to said expandable chamber means during a flow of fluid from said expandable chamber means through said conduit means and for accepting fluid from said expandable chamber means during a flow of fluid to said expandable chamber means from said conduit to thereby retard expansion and contraction of said expandable chamber means and operation of said valve means between said first and second positions.

11. An apparatus as set forth in claim 10 further including orifice means for retarding the flow of fluid to and from said expandable chamber means through said conduit means.

12. An apparatus as set forth in claim 4 further including pump means for supplying fluid at a first pressure which varies as a function of variations in the operating speed of the prime mover, said anti-stall means including orifice means connected in fluid communcation with said pump means for reducing the pressure of fluid from said pump to a second pressure which differs from said first pressure by an amount which varies as a function of variations in the operating speed of the prime mover, valve means for effecting a change in the pressure of the fluid conducted to said motor means, and actuator means for operating said valve means to effect a change in the pressure conducted to said motor means in response to a variation in the difference between said first and second pressures, said rate control means including means for retarding rapid changes in the difference between said first and second pressures during rapid changes in the loading of the prime mover.

13. An apparatus as set forth in claim 4, wherein said rate control means includes means for rendering said rate control means ineffective to retard operation of said anti-stall means when the magnitude of the change in the loading of the prime mover is in excess of a predetermined magnitude.

14. An apparatus for controlling the operation of a hydrostatic transmission driven by a prime mover and having a variable displacement hydrostatic unit, said apparatus comprising motor means for varying the displacement of the hydrostatic unit and the output speed of the hydrostatic transmission, anti-stall means for effecting operation of said motor means to vary the displacement of the hydrostatic transmission upon the occurrence of an impending overloading of the prime mover, and rate control means for retarding operation of said anti-stall means in response to a rapid variation in the loading of the prime mover, said rate control means including means for receiving fluid from and discharging fluid to said anti-stall means to thereby retard operation of said anti-stall means.

15. An apparatus for controlling the operation of a hydrostatic transmission driven by a prime mover and having a variable displacement hydrostatic unit, said apparatus comprising motor means for varying the displacement of the hydrostatic unit and the output speed of the hydrostatic transmission, anti-stall means for effecting operation of said motor means to vary the displacement of the hydrostatic transmission upon the occurrence of an impending overloading of the prime mover, and rate control means for retarding operation of said anti-stall means in response to a rapid variation in the loading of the prime mover, said rate control means including means for rendering said rate control means ineffective to retard operation of said anti-stall means upon the occurrence of relatively large variations in the loading of the prime mover.

* * * * *

UNITED STATES PATENT AND TRADEMARK OFFICE
CERTIFICATE OF CORRECTION

PATENT NO. : 3,886,741
DATED : June 3, 1975
INVENTOR(S) : Harold R. Ward

It is certified that error appears in the above-identified patent and that said Letters Patent are hereby corrected as shown below:

Col. 4, line 34:      "14" should read ---114---.

Col. 16, line 31:      After "means" insert ---for---.

Signed and Sealed this fifth Day of August 1975

[SEAL]

Attest:

RUTH C. MASON
Attesting Officer

C. MARSHALL DANN
Commissioner of Patents and Trademarks